United States Patent [19]

Taira et al.

[11] Patent Number: 6,104,437

[45] Date of Patent: Aug. 15, 2000

[54] DISPLAY SIGNAL PROCESSING DEVICE HAVING A CONTROLLABLE LED DISPLAY

[75] Inventors: Hiroyuki Taira; Kazuya Yamaguchi, both of Kagoshima, Japan

[73] Assignee: Matsushita Electric Industrial Co., Ltd., Osaka, Japan

[21] Appl. No.: 09/079,105

[22] Filed: May 14, 1998

[30] Foreign Application Priority Data

May 15, 1997 [JP] Japan ................................ 9-125318

[51] Int. Cl.⁷ ............................ H04N 5/445; H04N 5/46
[52] U.S. Cl. .................... 348/563; 348/558; 348/557; 348/584; 348/802
[58] Field of Search .................... 348/554, 555, 348/557, 558, 563, 584, 589, 598, 599, 600, 473, 484, 801, 802; H04N 5/46, 5/445, 9/74, 9/76

[56] References Cited

U.S. PATENT DOCUMENTS

| | | |
|---|---|---|
| 4,698,678 | 10/1987 | Collins ............................ 348/584 |
| 5,153,723 | 10/1992 | Citta .............................. 348/738 |
| 5,184,114 | 2/1993 | Brown . |
| 5,258,829 | 11/1993 | Matsunaga et al. . |
| 5,276,436 | 1/1994 | Shaw et al. . |
| 5,301,017 | 4/1994 | Murakami . |
| 5,319,214 | 6/1994 | Gregory et al. . |
| 5,917,552 | 6/1999 | Van Court ....................... 348/558 |

FOREIGN PATENT DOCUMENTS

| | | |
|---|---|---|
| 0 431 845 | 6/1991 | European Pat. Off. . |
| 0 574 901 | 12/1993 | European Pat. Off. . |
| 0 663 770 | 7/1995 | European Pat. Off. . |
| 0 710 016 | 5/1996 | European Pat. Off. . |
| 2197518 | 5/1988 | United Kingdom . |

OTHER PUBLICATIONS

European Search Report dated Oct. 25, 1999 for related application No. EP 98 10 8710.
Copy of Office Action dated Aug. 19, 1998 from corresponding Australian Application No. 64847/98.
European Search Report dated Aug. 5, 1999 for EP 98 10 8710.

Primary Examiner—Sherrie Hsia
Attorney, Agent, or Firm—Ratner & Prestia

[57] ABSTRACT

The device comprises a signal processing section and an LED display section. The signal processing section comprises a signal processor for identifying and processing a plurality of types of display signals. The signal processing section comprises a first signal processing section for processing a television signal, and a second signal processing section for processing a non-television signal. Functions performed by the LED display section include identifying and displaying a plurality of types of display signals and controlling the color range to be displayed.

14 Claims, 13 Drawing Sheets

DISPLAY SIGNAL PROCESSING DEVICE HAVING A CONTROLLABLE LED DISPLAY

BACKGROUND OF THE INVENTION

1. Field of the Invention

The present invention relates to a display signal processing device for processing a television signal and a non-television signal such as a graphic signal, and an LED display system incorporating the same.

2. Description of the Related Art

In recent years, full color LED display systems have been spreading rapidly in the field of indoor and outdoor information displays. Conventionally, such display systems often employ NTSC (National Television System Committee) video signals in accordance with the NTSC system. The NTSC video signals can be obtained from various video sources, such as televisions, VCRs, laser disk players, video cameras, and the like. Moreover, the demand for such display systems for use in a high resolution video display based on the HDTV (High Definition Television) standard is expected to increase in the near future.

Hereinafter, an exemplary structure of a conventional display system will be described with reference to FIG. 9.

In FIG. 9, the display system includes a transmission section 19 and a display section 20. The transmission section 19 includes: AV equipment such as a VCR 3, TV tuner 2, laser disk player 50 and video camera 4; an AV selector 5; a scheduler 9 for managing broadcast contents; a telopper 48 for processing videos; an amplifier 6; and a video signal transmitter 49 for long distance transmission of NTSC video signals. The display section 20 includes: a video signal receiver 113 for receiving NTSC video signals and converting the received signals to digital RGB (R: red, G: Green, B: blue) signals; a controller 14 for converting the digital RGB signals to signals suitable for an LED display section 8; an LED panel display 17; a power source 16; a loudspeaker 15; and a housing 18.

The operation of the display system having such a structure will be described.

The AV equipments in the transmission section 19 including a VCR 3, TV tuner 2, laser disk player 50 and video camera 4 are connected to the inputs of the AV selector 5. The AV selector 5 is controlled by the scheduler 9 so that the inputs of the AV selector 5 are selected and switched based on a schedule. An output from the AV selector 5 is input to the telopper 48, which performs necessary editing and processing of video signals (e.g.: superimposing characters on an image; shrinking an image and displaying characters in the emptied peripheral region of the image; or cutting away a portion of an image and inserting characters in the emptied portion). Thereafter, the resultant video signals are input to the video signal transmitter 49. The video signal transmitter 49 is responsible for signal amplification and cable loss compensation required for transmitting the NTSC video signal to the video signal receiver 113. The distance between the video signal transmitter 49 and the video signal receiver 113 is normally about 50 to 200 m.

FIG. 10 illustrates exemplary functional blocks of the video signal receiver 113. The video signal receiver 113 includes a Y/C separation circuit 21, a Y/U/V separation circuit 22, a sampling circuit 23, a clock generation circuit 52, a timing adjustment circuit 51, a scaling circuit 24 and an RGB conversion circuit 25. The Y/C separation circuit 21 separates an NTSC video signal into a color signal C and a luminance signal Y. The Y/U/V separation circuit 22 separates the color signal C into color difference signals R-Y (U) and B-Y (V).

The clock generation circuit 52 generates a reference clock signal of a frequency which is an integer multiple of the carrier frequency of the video signal, and provides the reference clock signal to the RGB conversion circuit 25, while the timing of the clock signal is adjusted by the timing adjustment circuit 51 so that a timed clock signal is provided to the sampling circuit 23 and the scaling circuit 24.

The separated signals are subjected to analog/digital conversion by the sampling circuit 23, scaled to the effective display region by the scaling circuit 24, and then converted to digital RGB signals by the RGB conversion circuit 25.

FIG. 11 illustrates exemplary functional blocks of the controller 14. The controller 14 includes a gamma conversion table 39, a multiplier 41 and a display division circuit 42. The output of the video signal receiver 113 is input to the controller 14, which performs an inverse gamma conversion by multiplying the input data by a coefficient from a gamma conversion table 39, so as to correct the characteristic difference between CRT and LED. Then, the display signal is divided by the display division circuit 42 into units corresponding to the LED panel displays 17 and converted into a format readable for the LED panel display 17.

The LED display section 8 in the display section 20 is illustrated in a simplified manner. In practice, the LED display section 8 includes a number of LED panel displays 17 arranged in rows and columns which are switched between the display state and the nondisplay state based on signals output from the controller 14. Each of light emitting blocks in the LED panel display 17 includes three LEDs respectively for the primary colors, R, G and B.

Table 1 below shows characteristics of a typical LED currently used in commercial applications.

TABLE 1

| | Characteristics of typical LED used in commercial applications | | | |
|---|---|---|---|---|
| | Chromaticity coordinates | | Peak wavelength | Luminous efficiency |
| Output Color | X | Y | (nm) | (lm/W) |
| R (red) | 0.7 | 0.295 | 660 | 6.6 |
| G (green) | 0.17 | 0.7 | 520 | 10.0 |
| B (blue) | 0.15 | 0.07 | 475 | 3.6 |
| YG (yellow green) | 0.43 | 0.56 | 567 | 6.0 |
| BG (blue green) | 0.08 | 0.4 | 495 | 8.0 |

FIG. 12 is another representation of Table 1 as a chromaticity diagram based on the CIE (Commission Internationale de l'Eclairage) standard xyz calorimetric system (hereinafter, referred to simply as "chromaticity diagram"). In FIG. 12, chromaticity coordinate values of a typical LED are represented by symbols such as R, G and B, while the respective display color ranges for the CRT and NTSC signals are represented by triangular regions.

However, when an NTSC video signal is displayed using the structure as illustrated in FIG. 9, the RGB signals obtained by separating the video signal are directly used for controlling the LED at three points, R, G and B (hereinafter, such control is referred to as "3 point control"). Thus, as is apparent from FIG. 12, there is a problem that the respective RGB chromaticity coordinate values do not conform with the display color ranges of CRT and NTSC signals.

The display color range of the structure illustrated in FIG. 9 can be adjusted to that of CRT in advance. However, in such a case, when it is desired to display graphic data of RGB signals such as those made on a personal computer, any chromaticity beyond the display color range of CRT cannot be represented.

SUMMARY OF THE INVENTION

The term "display signal" as used herein generically refers to any signal displayed on an LED and includes a television signal such as an NTSC signal and an HDTV signal, and any other non-television signal such as a graphic signal.

The display system of the present invention includes: an LED display section having light emitting blocks which are arranged in matrix and each include three or more LEDs of different colors; a display signal transmission section for providing a plurality of display signals to be displayed on the LED display section; a display signal identification section for identifying the types of the plurality of display signals; and a color range control section for setting a display color range to be displayed on the LED display section based on signals output from the display signal identification section.

For example, the display signal identification section identifies a television signal, such as an NTSC signal and a high definition television (HDTV) signal, and a graphic signal such an analog RGB signal, so that a control system selection circuit selects a display color range of the LED display section based on the identification result. For example, multiple point control (at three or more points) is conducted in displaying a graphic, while 3 point control is conducted in displaying a television signal. The mixing ratio and the light intensity ratio are varied between an NTSC signal and an HDTV signal. Of course, if the CRT chromaticity range can be displayed, multiple point control may be conducted in displaying video signals.

The mixing ratio as used herein refers to which LEDs are used among those of R, G, B, . . . , in a light emitting block in order to obtain an intended color, i.e., selection of the type, number, etc., of LEDs to be illuminated. The light intensity ratio as used herein refers to the ratio among the respective intensities of light emissions from the selected LEDs. The light intensity ratio can be controlled by, for example, varying the respective electric current values, e.g., the number of pulses, to be applied to the LEDs.

According to one aspect of this invention, a display signal processing device for processing a plurality of types of display signals includes: a first signal processing section for processing a television signal; and a second signal processing section for processing a non-television signal. Thus, it is possible to process either one of two different types of display signals such as a television signal and a graphic signal.

In one embodiment of the invention, a first analog signal is input to the first signal processing section as the television signal, while a second analog signal is input to the second signal processing section as the non-television signal. The first signal processing section includes a sampling circuit for converting the first analog signal to a first digital signal and an RGB conversion circuit for converting the first digital signal to an RGB signal. The second signal processing section includes an A/D conversion circuit for converting the second analog signal to a second digital signal. Thus, it is possible to obtain a digital signal from either one of the outputs from the first and second signal processing sections.

In another embodiment of the invention, the first signal processing section further includes a first scaling circuit for scaling the first digital signal. The second signal processing section further includes a second scaling circuit for scaling the second digital signal.

In still another embodiment of the invention, the television signal is one of an NTSC signal, an HDTV signal, a PAL signal and a SECAM signal, while the non-television signal is a graphic signal.

In still another embodiment of the invention, the first signal processing section includes an identification circuit for identifying a type of the television signal. Thus, it is possible to distinguish a television signal and a non-television signal.

In still another embodiment of the invention, the identification circuit identifies the type of the television signal by detecting a unique component contained in the television signal. By detecting such components unique to a television signal, a television signal can be clearly distinguished from a non-television signal.

According to another aspect of this invention, an LED display system includes: an LED display section including a plurality of light emitting blocks arranged in matrix, the light emitting blocks each including three or more LEDs of different colors; a display signal transmission section for transmitting a plurality of types of display signals to the LED display section; a display signal identification section for identifying the type of the display signal; and a color range control section for controlling a color range to be displayed on the LED display section depending on the type of the display signal identified by the display signal identification section. For example, the display signal identification section identifies a television signal, such as an NTSC signal and a high definition television (HDTV) signal, and a graphic signal such an analog RGB signal. Therefore, based on the identification result, when the supplied signal is a television signal, a display comparable to that conducted by a conventional CRT may be conducted, while a display may be conducted within the original display color range of the LED when the supplied signal is a graphic display signal. Thus, it is possible to display a color in accordance with the type and contents of the display signal.

In one embodiment of the invention, the display signal identification section identifies the type of the display signal by detecting a unique component contained in the display signal.

Thus, it is possible to reliably identify a television signal. This ensures the distinguishment between television signals, between television signals and non-television signals, or between non-television signals.

In another embodiment of the invention, the display signal identification section identifies the type of the display signal depending on a selection signal which indicates a selected one of the plurality of types of display signals.

Thus, it is possible to identify the types of display signals based on a selection signal. Therefore, components unique to the display signals are not required to be detected. Accordingly, a detection circuit for detecting such components can be omitted from the receiver side, thereby simplifying the circuit.

In still another embodiment of the invention, the color range control section includes: a control system selection circuit for selecting a control system of the LED display section depending on the type of the display signal; and a conversion section for converting a chromaticity coordinate of the display signal depending on the control system selected by the control system selection circuit.

Thus, it is possible to simplify a circuit structure of the color range control section.

In still another embodiment of the invention, the display signal identification section outputs an identification signal indicating the type of the display signal. The identification signal is a digital signal. Thus, it is possible to directly add the identification signal to the display signal which has been processed and digitalized, whereby the display selection circuit is not required.

In still another embodiment of the invention, the conversion section includes: a plurality of conversion tables provided to respectively correspond to the plurality of types of display signals; a conversion table selection circuit for selecting one of the plurality of conversion tables; and a gamma conversion table provided commonly among the plurality of types of display signals. Thus, the gamma conversion table can be shared, whereby it is possible to simplify the circuit structure.

In still another embodiment of the invention, the conversion section further includes: a multiplier for multiplying an output of the selected one of the plurality of conversion tables by an output of the gamma conversion table. Thus, it is possible to simplify the circuit structure.

In still another embodiment of the invention, the conversion section includes: at least two processing sections each for processing chromaticity coordinate values for three or more points. Thus, it is possible to set different color ranges for two different types of signals such as a television signal and a graphic signal.

In still another embodiment of the invention, the at least two processing sections include a processing section for a television signal and a processing section for a non-television signal. Thus, the color range can be controlled in a manner that most suits the particular display signal. For example, a color range may be controlled under the 3 point control for a television signal, and under 5 point control for a non-television signal.

In still another embodiment of the invention, the at least two processing sections include processing sections for two types of television signals. Thus, it is possible to accept television signals of two different systems.

A common conversion table selection circuit is provided for a plurality of display signals. Thus, the color range may be controlled in the same way regardless of the type of display signal. For example, when the 5 point control is selected for controlling a graphic signal, the color range is controlled under the 5 point control also for an NTSC signal and a HDTV signal, for example, thereby more precisely controlling the color range.

Thus, the invention described herein makes possible the advantage of conducting a display comparable to that conducted by a conventional CRT in displaying video signals, while conducting a display within the original display color range of the LED in displaying a graphic.

This and other advantages of the present invention will become apparent to those skilled in the art upon reading and understanding the following detailed description with reference to the accompanying figures.

DESCRIPTION OF THE PREFERRED EMBODIMENTS

EXAMPLE 1

Figure 1:
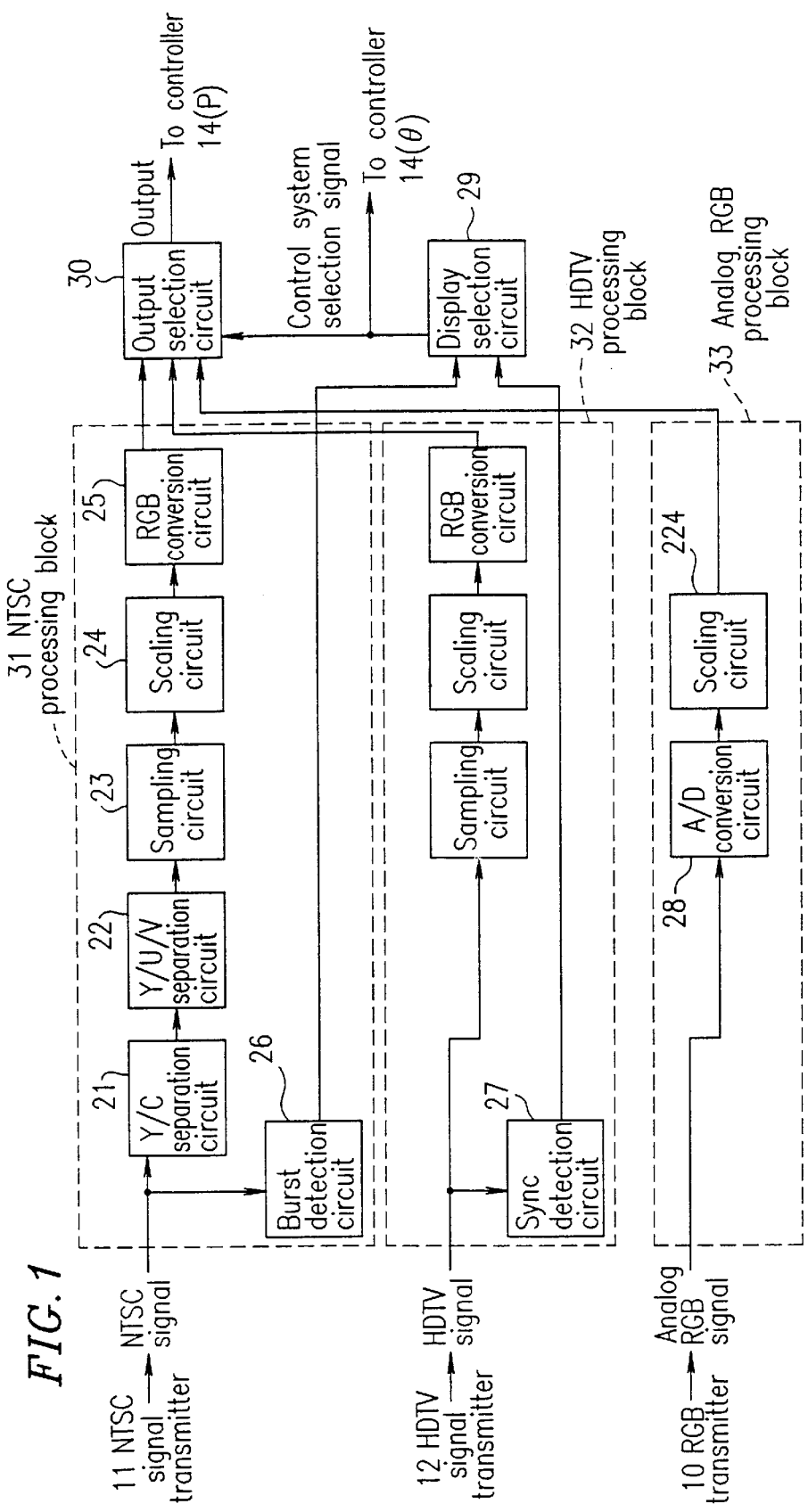
FIG. 1 is a diagram illustrating a structure of a display system according to Example 1 of the present invention.
Figure 2:
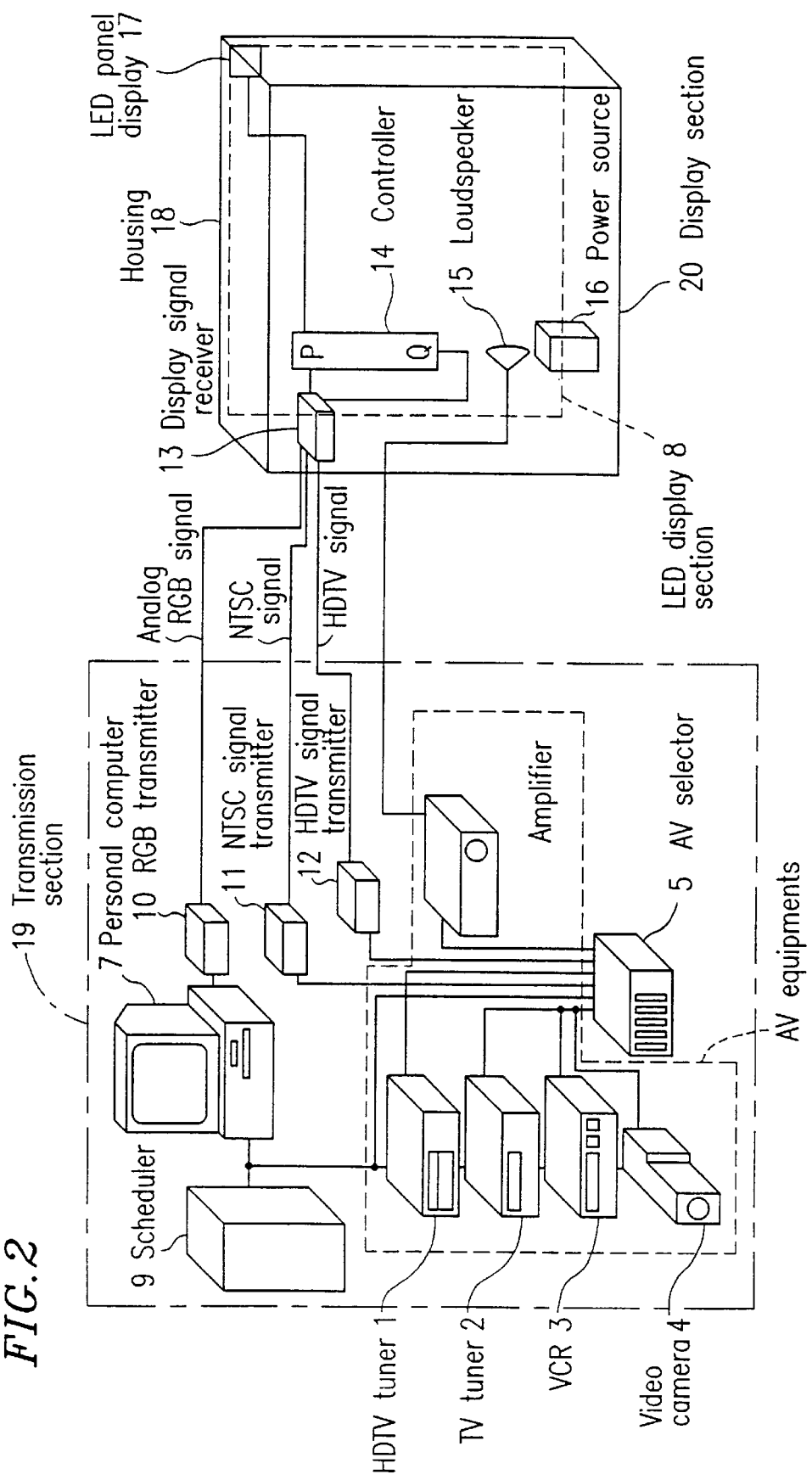
FIG. 2 is a diagram illustrating functional blocks of a display signal receiver according to Example 1 of the present invention.
Figure 3:
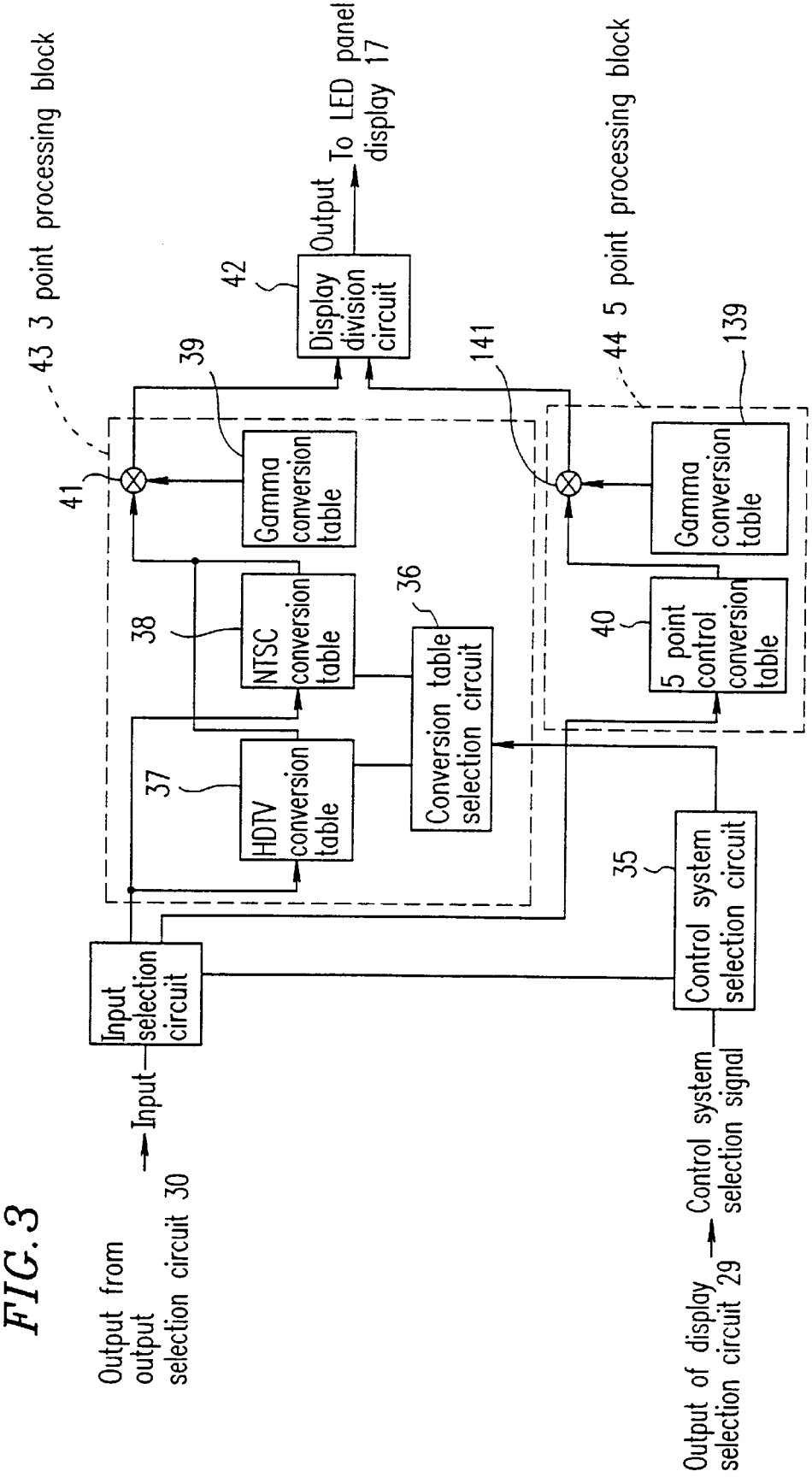
FIG. 3 is a diagram illustrating functional blocks of a controller according to Example 1 of the present invention.

FIG. 1 illustrates a display signal receiver including a display signal processing device of the present invention; FIG. 2 illustrates a schematic diagram of an LED display system of the present invention; and FIG. 3 illustrates a controller having a color range control function.

In the present example, different transmission systems are provided for signals of different systems such as: a video signal based on the NTSC system (hereinafter, referred to as "NTSC signal"); a video signal based on the HDTV system (hereinafter, referred to as "HDTV signal"); and an analog RGB graphic signal (hereinafter, referred to as "analog RGB signal"). However, the transmission systems may be integrated together.

Hereinafter, the 5 point control will be described, but it is also possible to employ 3 or 4 point control, or control at more than 5 points depending on the cost and the intended performance to be realized.

Figure 13:
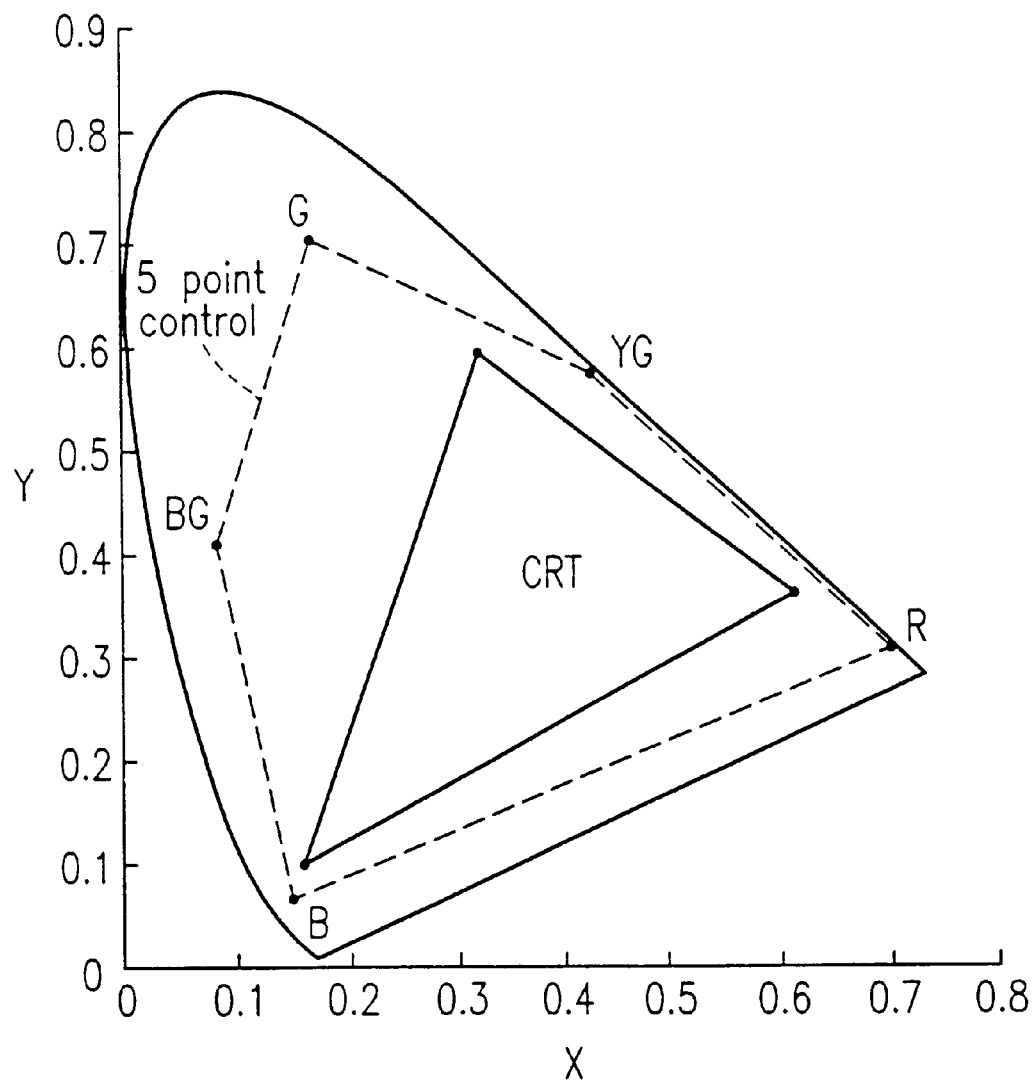
FIG. 13 is a diagram illustrating a display color range obtained by 5 point control.

FIG. 13 illustrates a display color range obtained by the 5 point control. In the case of the 5 point control, five LEDs of different colors are combined to form one light emitting block, and the display color range is larger than that of a CRT, whereby it is possible to display colors unique to LED which cannot be expressed by a CRT.

FIG. 1 illustrates exemplary functional blocks of a display signal receiver 13 of the present invention. The display signal receiver 13 has a function as a display signal identification section for identifying the types of the display signals to be displayed on the LED, and is arranged to receive three signals, e.g., an NTSC signal, an HDTV signal and an analog RGB signal. The respective primary color chromaticity coordinates of the NTSC signal and the HDTV signal differ from each other as shown in Table 2 below, whereby colors cannot be displayed accurately when video signals of different standards are displayed by simply separating them into the three primary colors, R, G and B.

TABLE 2

Coordinate values of primary colors in chromaticity diagram for television standards and CRT

| Primary | NTSC (SMPTR RS170A) | | HDTV (CCIR Rec709) | | CRT | |
| --- | --- | --- | --- | --- | --- | --- |
| colors | X | Y | X | Y | X | Y |
| R (red) | 0.67 | 0.33 | 0.64 | 0.33 | 0.61 | 0.35 |
| G (green) | 0.21 | 0.71 | 0.3 | 0.6 | 0.32 | 0.58 |
| B (blue) | 0.14 | 0.08 | 0.15 | 0.06 | 0.16 | 0.1 |

Therefore, in order to display video signals of different standards, it is necessary to vary the LED mixing ratio and the light intensity ratio so that the chromaticity coordinates of the primary colors conform with the standards. Thus, different signal processing methods are used depending on whether an input signal is a television signal or a graphic signal, and on whether it is an NTSC signal or an HDTV signal if the input signal is a television signal.

Before referring to FIG. 1, the LED display system illustrated in FIG. 2 will be briefly described. The AV equipment in the transmission section 19 including the VCR 3, the TV tuner 2, the video camera 4, all in conformity with the NTSC system, and an HDTV tuner 1 are connected to the inputs of the AV selector 5. The AV selector 5 is controlled by the scheduler 9 so that the inputs of the AV selector 5 are selected and switched based on a schedule. The AV selector 5 outputs a video signal to an NTSC signal transmitter 11 when an NTSC equipment is selected while outputting the video signal to an HDTV signal transmitter 12 when an HDTV equipment is selected. When the scheduler 9 selects a personal computer 7 for graphic display, a graphic signal is output to an RGB transmitter 10. The outputs of the equipments which are not selected by the scheduler 9 are disabled. The NTSC signal transmitter 11, the HDTV signal transmitter 12 and the RGB transmitter 10 are responsible for signal amplification and cable loss compensation required for transmission to the display signal receiver 13 in the display section 20.

FIG. 1 illustrates specific circuit blocks of the display signal receiver 13, including three signal processing blocks 31, 32 and 33 respectively for an NTSC signal, an HDTV signal, and an analog RGB signal.

First, the case where an input signal is an NTSC signal will be described. The NTSC signal is transmitted from the video signal transmitter 11 in the transmission section 19 illustrated in FIG. 2.

The NTSC signal processing block 31 includes a burst detection circuit 26, the Y/C separation circuit 21, the Y/U/V separation circuit 22, the sampling circuit 23, the scaling circuit 24 and the RGB conversion circuit 25. The burst detection circuit 26 detects a burst signal in the NTSC signal so as to output the detected output to a display selection circuit 29. The Y/C separation circuit 21 separates the NTSC signal into a color signal C and a luminance signal Y. The Y/U/V separation circuit 22 separates the color signal C into color difference signals U and V.

The separated signals are subjected to analog/digital conversion by the sampling circuit 23, scaled to the effective display region by the scaling circuit 24. The scaling circuit 24 has a function of shrinking, for example, the NTSC signal. When the NTSC signal is directly sampled at the carrier frequency, for example, the signal will have 640×480 dots. The scaling circuit 24 reduces it so that the signal has 320×240 dots. Alternatively, the scaling circuit 24 may have a function to increase the number of dots.

The scaled signal is converted to a digital RGB signal by the RGB conversion circuit 25. Although the NTSC signal is assumed to be a composite signal in this example, it may be an S (Separate) signal, in which case, substantially the same structure may be used except that the Y/C separation circuit is not necessary.

HDTV signals are transmitted from the HDTV signal transmitter 12. Since they are component signals, the Y/C separation circuit 21 and the Y/U/V separation circuit 22 are not required in the HDTV signal processing block 32, unlike the NTSC signal processing block 31. Although the other circuit functions are basically the same as those of the NTSC signal processing block 31, since the standard specification such as the video signal band, the aspect ratio and the field frequency are different from those for NTSC signals, the circuit structure thereof is accordingly different.

A sync detection circuit 27 detects a sync signal in the HDTV signal and outputs the signal output to the display selection circuit 29.

Analog RGB signals are transmitted from the RGB transmitter 10. The analog RGB processing block 33 includes an A/D conversion circuit 28 and a scaling circuit 224. An analog RGB signal is converted to a digital RGB signal by the A/D conversion circuit 28, and then scaled to the effective display region by the scaling circuit 224.

In FIG. 2, three signal processing blocks are illustrated respectively for the television signals such as the NTSC signal acid the HDTV signal, and the analog RGB signal (graphic signal) which is a non-television signal. However, this is only exemplary, and all of the display signals may be television signals including a PAL signal and a SECAM signal. In such a case, it is still possible to distinguish one signal from another by providing circuits such as the burst detection circuit and the sync detection circuit.

Alternatively, all of the display signals may be non-television signals such as the graphic signal. In such a case, it is possible to easily distinguish one signal from another, for example, by providing an identification signal to each of the graphic signals or by providing an index signal to each of the graphic signals on the side of transmitting the display signals.

The display selection circuit 29 determines how to control the LED display section 8 (i.e., the control system of the LED display section 8) based on the outputs of the burst detection circuit 26 in the NTSC signal processing block 31 and the sync detection circuit 27 in the HDTV signal processing block 32, and outputs the results to the controller 14.

In particular, when the signal from the burst detection circuit 26 is effective, the display selection circuit 29 determines the input signal to be an NTSC signal, and outputs to the controller 14 a signal indicating the 3 point control and an NTSC signal conversion table 38 (FIG. 3), as a control system selection signal, while an output selection circuit 30 outputs data from the NTSC signal processing block 31.

Similarly, when the signal from the sync detection circuit 27 is effective, the display selection circuit 29 determines the input signal to be an HDTV signal, and outputs to the controller 14 a signal indicating the 3 point control and an HDTV signal conversion table 37 (FIG. 3), as a control system selection signal, while the output selection circuit 30 outputs data from the HDTV signal processing block 32.

On the other hand, when there is no signal from either the burst detection circuit 26 or the sync detection circuit 27, the display selection circuit 29 determines the input signal to be a graphic display signal, and outputs to the controller 14 a signal indicating the 5 point control, as a control system selection signal, while the output selection circuit 30 outputs data from the analog RGB processing block 33 to the controller 14.

In this example, the burst signal and the sync s anal (horizontal synchronization signal) are used to distinguish the television signals, i.e., the NTSC signal and the HDTV signal. This is because an NTSC signal includes a burst signal while an HDTV signal does not include a burst signal, and the sync signal of the NTSC signal is binary while that of the HDTV signal is ternary, whereby it is possible to reliably distinguish the NTSC and HDTV signals by detecting such signals.

The display selection circuit 29 allows the types of display signals such as a video signal or a graphic signal to be automatically selected, whereby it is possible to set the display color range in accordance with the selected type of video signals. Thus, the burst detection circuit 26 and the display selection circuit 29, or the sync detection circuit 27 and the display selection circuit 29, form a display signal identification section for identifying the types of the LED display signal (display signal).

Next, FIG. 3 illustrates exemplary functional blocks of the controller 14 having a function as a color range control section. The controller 14 selects a display color range out of a plurality of preset display color ranges according to the type of the input LED display signal.

The controller 14 includes a 3 point control processing block 43 and a 5 point control processing block 44 as the main components thereof. The 3 point control processing block 43 includes the HDTV signal conversion table 37, the NTSC signal conversion table 38, the gamma conversion table 39, a conversion table selection circuit 36 and the multiplier 41. The 5 point control processing block 44 includes a 5 point control conversion table 40, a gamma conversion table 139 and a multiplier 141.

A control system selection circuit 35 selects, based on the control system selection signal, either the 3 point control processing block 43 or the 5 point control processing block 44 to which to input the RGB digital signal input to the controller 14 from the display signal receiver 13. Moreover, when the 3 point control is selected, the control system selection circuit 35 instructs the conversion table selection circuit 36 to use either the HDTV signal conversion table 37 or the NTSC signal conversion table 38 based on the control system selection signal.

When the NTSC signal conversion table 38 is selected, the RGB digital signal input from the display signal receiver 13 is converted by the NTFSC signal conversion table 38 so as to conform with the NTSC signal display color range. The NTSC signal conversion table 38 is a conversion table which defines the most suitable mixing ratio and the light intensity ratio for the three colors of the LED to conform with the NTSC signal display color range for each of the input colors, R, G and B. Then, a correction is made by the gamma conversion table 39 so that the relationship between the voltage applied to the CRT and the light intensity thereof is the same as the relationship between the voltage applied to the LED and the light intensity thereof.

When the HDTV signal conversion table 37 is selected, conversion is performed as described above using the HDTV signal conversion table 37. The HDTV signal conversion table 37 functions as a conversion table which defines most suitable mixing ratio and the light intensity ratio for the three colors of the LED to conform with the HDTV signal display color range for each of the input colors, R, G and B.

When the 5 point control is selected, the RGB digital signal input from the display signal receiver 13 is converted by the 5 point control conversion table 40 so as to have the most suitable mixing ratio and the light intensity ratio for the five colors (R, G, B, YG and BG) to which the LED's light emitting characteristic is added according to the intensity for each of the colors, R, G and B. Then, a correction is made by the gamma conversion table 139 so that the relationship between the voltage applied to the CRT and the light intensity thereof is the same as the relationship between the voltage applied to the LED and the light intensity thereof.

The converted data is divided by the display division circuit 42 into units corresponding to the LED panel displays 17 and altered to have a timing such that the signal is readable for the LED panel display 17.

As is apparent from this example, the type of the display signal is detected within the display signal receiver, whereby it is possible to display the most suitable colors for the type of the display signals without additionally providing any signal line between the transmission section 19 and the display section 20.

The display signal receiver 13 of the present example is described to have a particular procedure of converting an NTSC signal, an HDTV signal and an analog RGB signql to a digital RGB signal. However, the same function can be realized by different procedures. For example, the scaling circuit 24 and the RGB conversion circuit 25 may be switched around. Moreover, although the NTSC signal and the HDTV signal are distinguished from each other based on the burst and sync signals in the present example, it is also possible to use, as the identification signal, the frequency of the horizontal synchronization signal, the frequency of the vertical synchronization signal, the frequency band of the video signal, or the like, as these are different between NTSC and HDTV.

EXAMPLE 2

Figure 4:
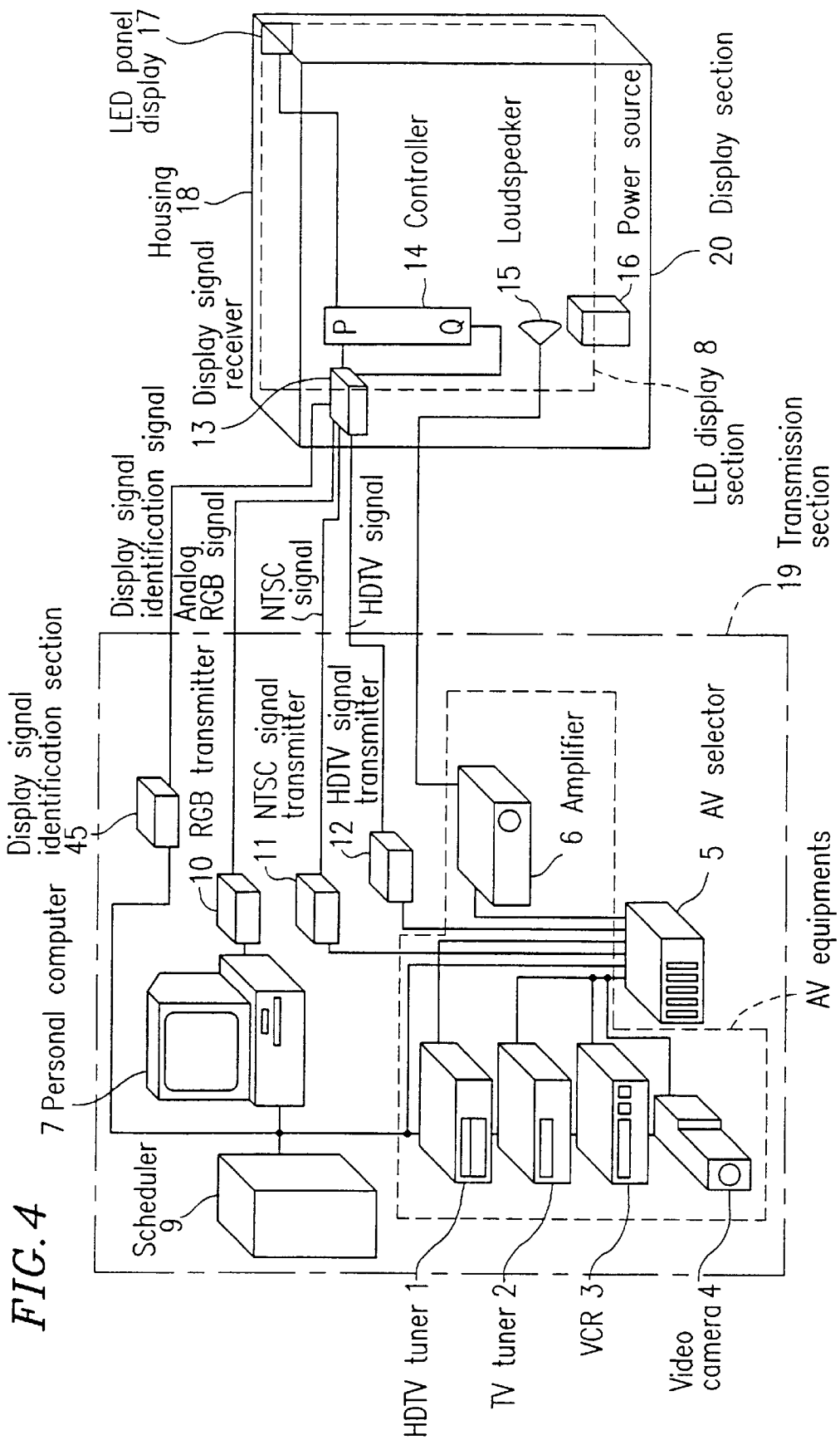
FIG. 4 is a diagram illustrating a structure of a display system according to Example 2 of the present invention.
Figure 5:
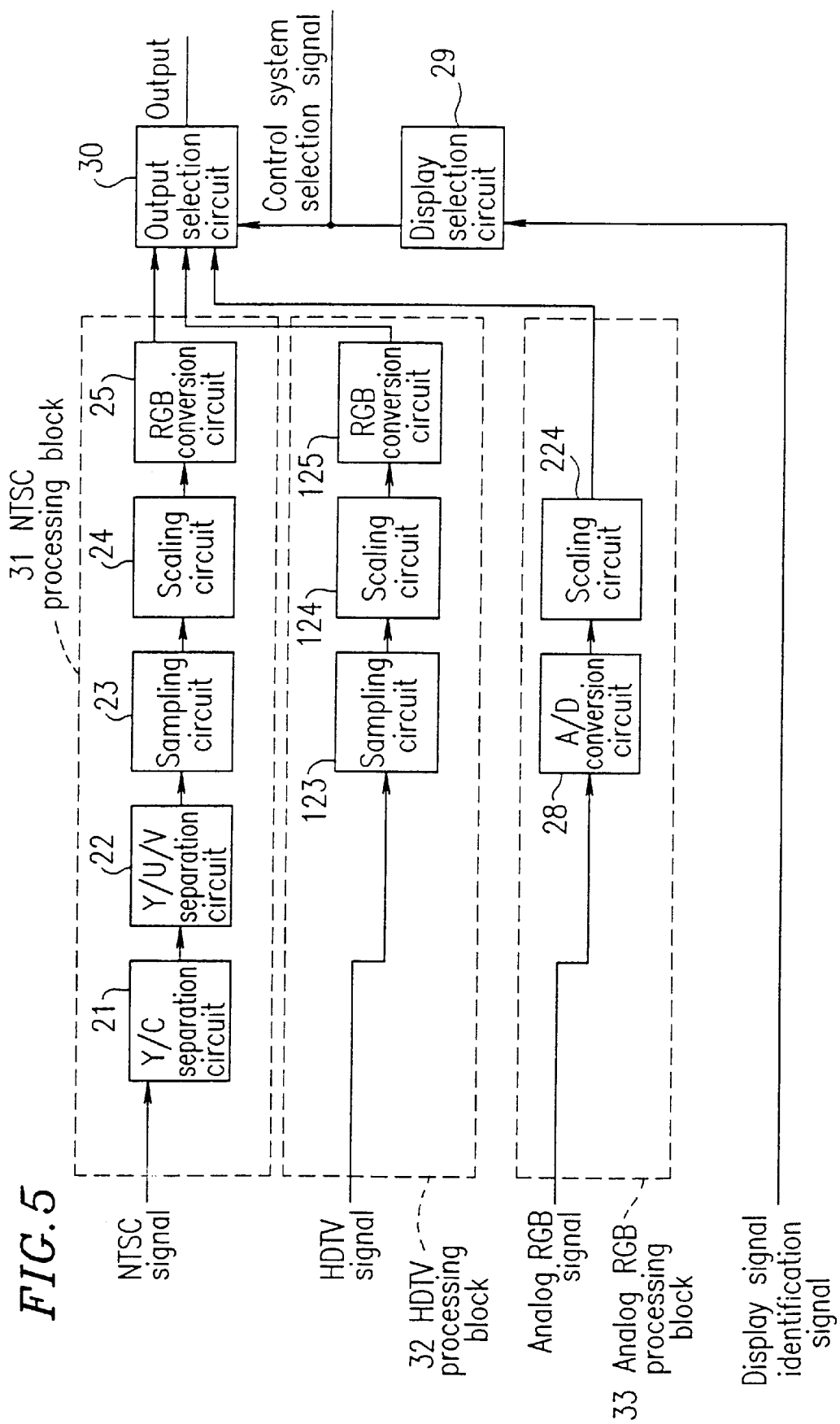
FIG. 5 is a diagram illustrating functional blocks of a display signal receiver according to Example 2 of the present invention.

FIGS. 4 and 5 illustrate Example 2 of the present invention.

Example 2 is different from Example 1 in, the main part of the display signal receiver 13, i.e., the display signal identification section for identifying the NTSC signal, the HDTV signal and the analog RGB signal.

A display signal identification section 45 is provided for identifying the type of display signals by detecting a selected signal from the input channel of the AV selector 5 selected by the scheduler 9. In particular, the equipments to be connected to the AV selector 5 and the corresponding channels are predetermined. For example, when the number of input channels of the scheduler 9 is eight, the channels 1–4 are assigned to the NTSC signal while the channels 5–8 are assigned to the HDTV signal. Then, when the scheduler 9 selects one of the channels 1–4 of the AV selector 5, the display signal identification section 45 detects the selection and transmits an index signal indicating the NTSC signal to the display signal receiver 13. Similarly, when the scheduler 9 selects one of the channels 5–8 of the AV selector 5, the display signal identification section 45 detects the selection and transmits an index signal indicating the HDTV signal to the display signal receiver 13. Moreover, when the scheduler 9 selects the personal computer 7, an index signal indicating the analog RGB signal is transmitted to the display signal receiver 13.

FIG. 5 illustrates the functional blocks of the display signal receiver 13 according to the present example.

In this exemplary structure, the burst detection circuit 26 and the sync detection circuit 27 of Example 1 are not required. Since an identification signal which indicates the type of a display signal is transmitted from the display signal identification section 45, the display signal receiver 13 does not need to detect the type of the display signal. The display selection circuit 29 selects the display signal to be transmitted to the controller 14 and generates the control system selection signal which determines the control system, based on an identification signal sent from the display signal identification section 45.

EXAMPLE 3

Figure 6:
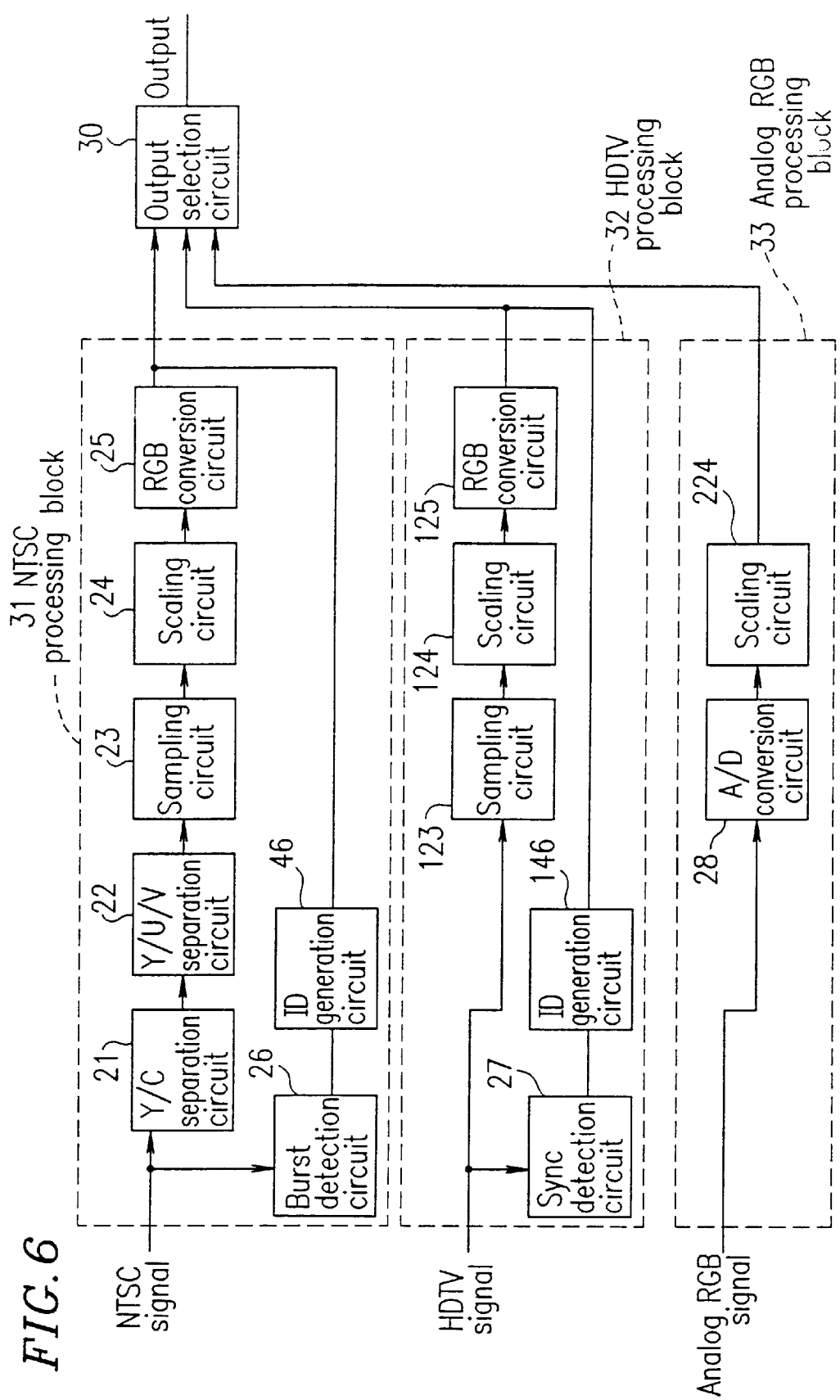
FIG. 6 is a diagram illustrating functional blocks of a display signal receiver according to Example 3 of the present invention.

Hereinafter, another example of the display signal receiver 13 will be described with reference to FIG. 6.

Example 3 is different from Example 1 in the signal selection method. In the following description, the difference from Example 1 will be mainly described.

Determination on whether the video signal is an NTSC signal or an HDTV signal is similar to that of Example 1, i.e., a burst signal is detected for the NTSC signal while a sync signal is detected for the HDTV signal. A difference from Example 1 is that ID (identification signal) generation circuits 46 and 146 are provided instead of the display selection circuit 29. The ID generation circuit detects a burst or sync signal and generates a digital signal indicating a corresponding ID (identification signal). For example, "01", "11" and "00" may be assigned to the NTSC signal, the HDTV signal and the graphic signal, respectively. The ID is appended to the original data signal, and the resultant signal is input to the output selection circuit 30.

At the time when the NTSC signal, the HDTV signal and the analog RGB signal are input to the output selection circuit 30, these signals are digitized, whereby the ID can be directly appended to the signals. Thus, the display selection circuit 29 as illustrated in FIG. 1 is not required.

The ID can be transmitted by extending the data line. For example, when the data line is 8-bit, 2 more bits are added thereto. The additional two bits are assigned to the ID. Other possible approaches include multiplexing the ID with the horizontal synchronization signal or the vertical synchronization signal.

EXAMPLE 4

Figure 7:
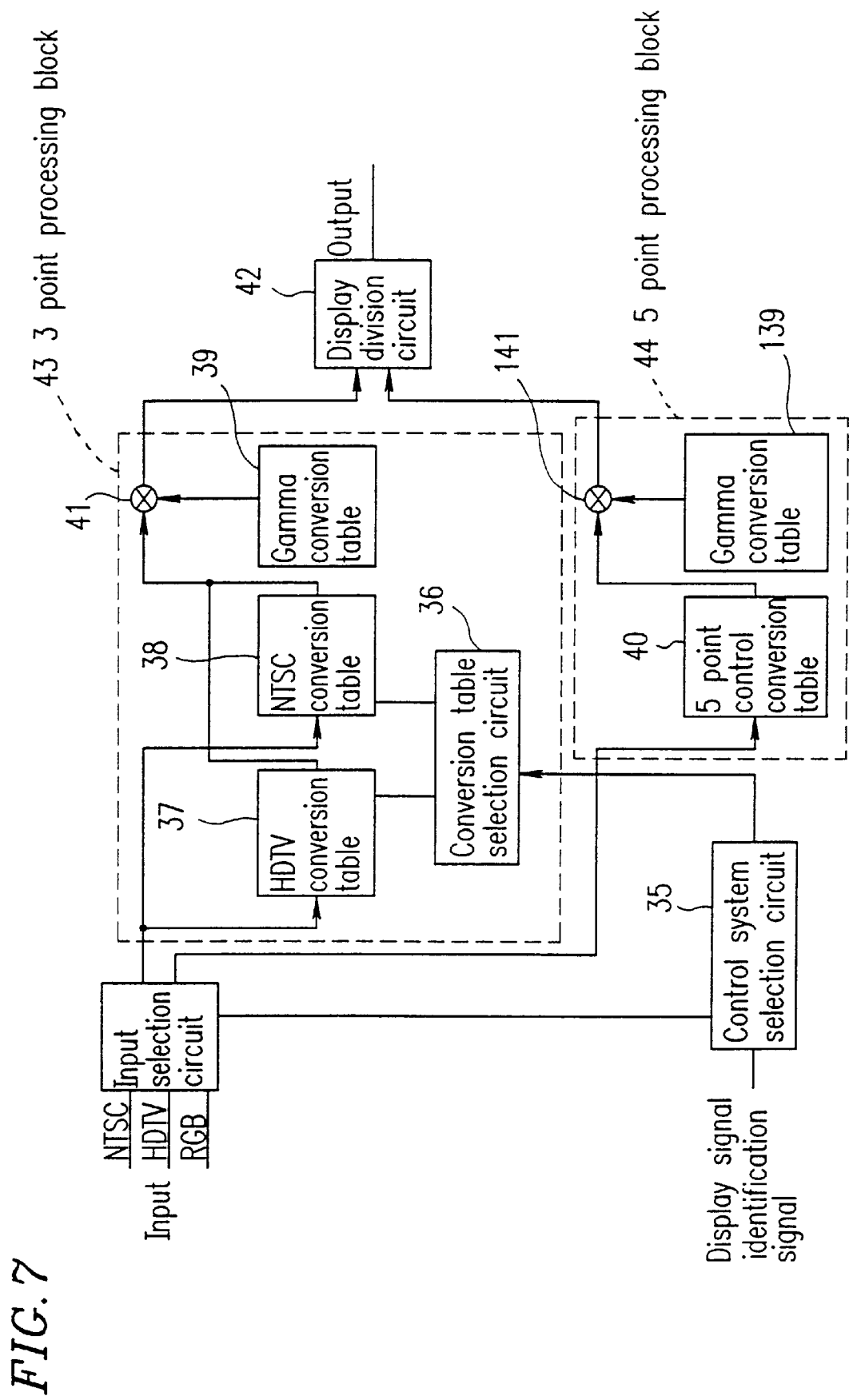
FIG. 7 is a diagram illustrating functional blocks of a controller according to Example 4 of the present invention.

FIG. 7 illustrates another example of the controller 14.

The present example and Example 2 are different from each other in whether the identification of the NTSC signal, the HDTV signal and the analog RGB signal is performed by the display signal receiver 13 or the controller 14.

In the following description, the difference from Example 2 will be mainly described.

The display signal identification signal sent from the display signal identification section 45 is not used by the display signal receiver 13 but used by the controller 14. Theefore, the display signal receiver 13 converts the NTSC signal, the HDTV signal and the analog RGB signal to a digital RGB signal, and sends all types of data to the controller 14.

In the controller 14, the display signal identification signal is input to the control system selection circuit 35. According to the display signal identification signal, the input display signal is selected, so as to switch the signal flow either to the 3 point control processing block 43 or the 5 point control processing block 44. In particular, when the display signal identification signal indicates an NTSC signal, the input signal flows to the 3 point control processing block 43. Also when the display signal identification signal indicates an HDTV signal, the input signal is input to the 3 point control processing block. When the display signal identification signal indicates an analog RGB signal, the input signal is input to the 5 point control processing block 44. The conversion table selection circuit 36 further selects one of the NTSC signal conversion table 38 and an HDTV conversion table 37 according to the type of the display signal identification signal indicating whether the NTSC signal or the HDTV signal.

In this structure, the main part of the display signal receiver 13 substantially functioning as the display signal identification section is not required.

EXAMPLE 5

Figure 8:
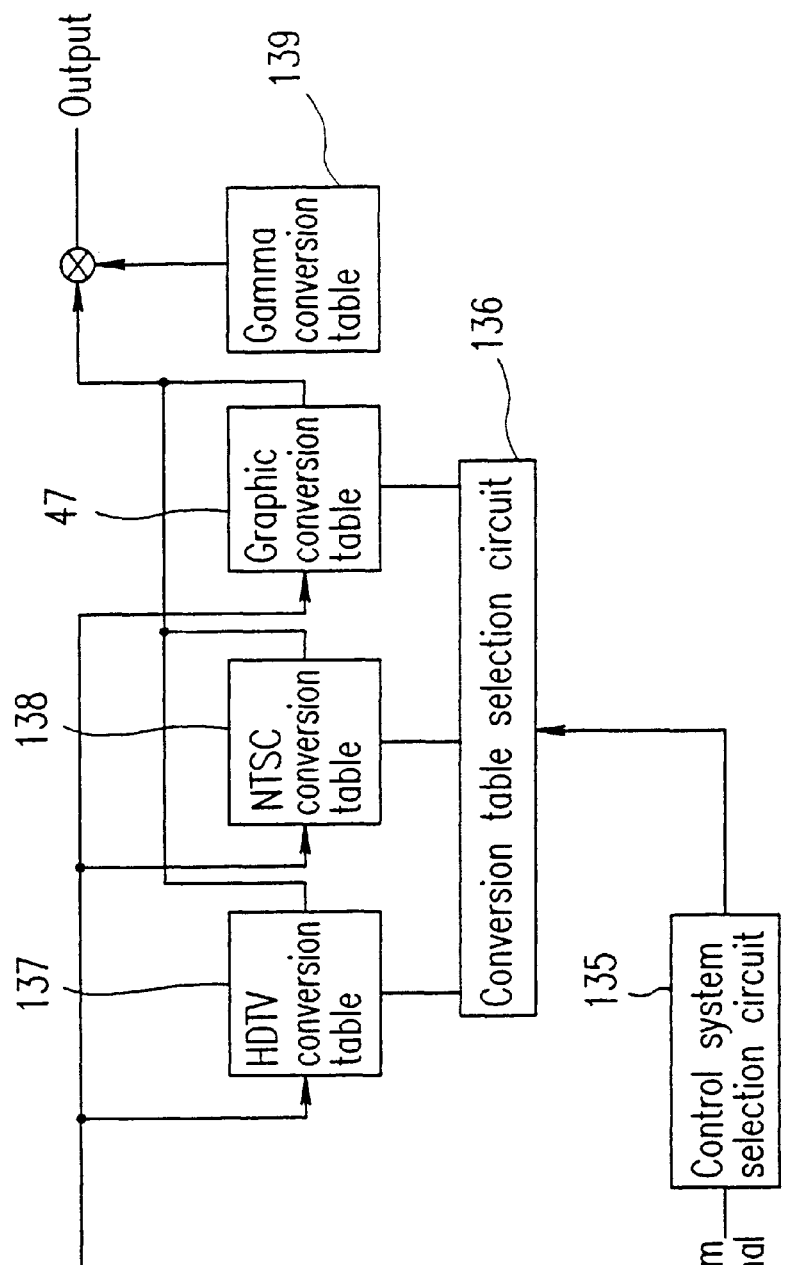
FIG. 8 is a diagram illustrating functional blocks of a controller according to Example 5 of the present invention.
Figure 9:
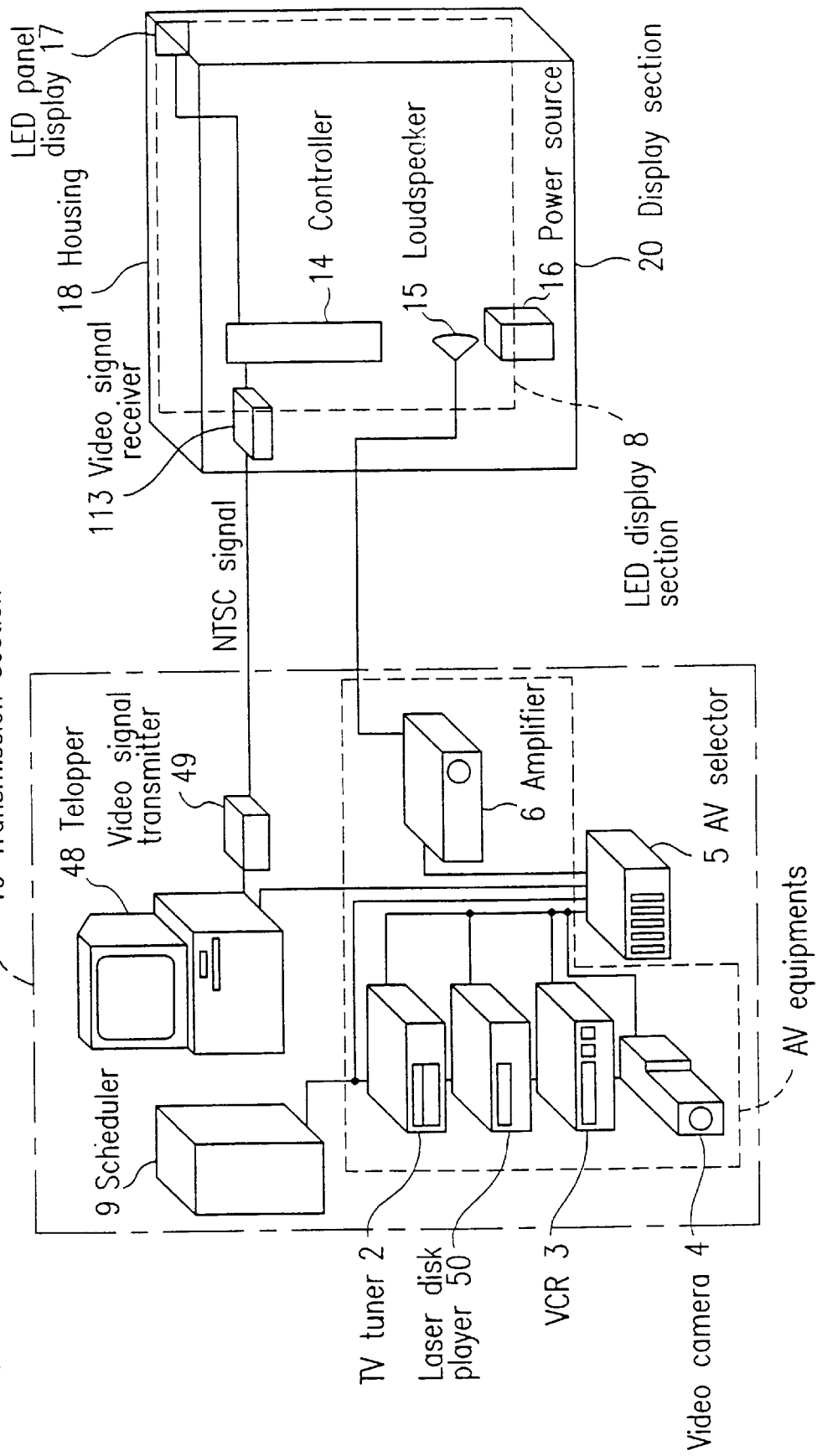
FIG. 9 is a diagram illustrating a structure of a conventional display system.
Figure 10:
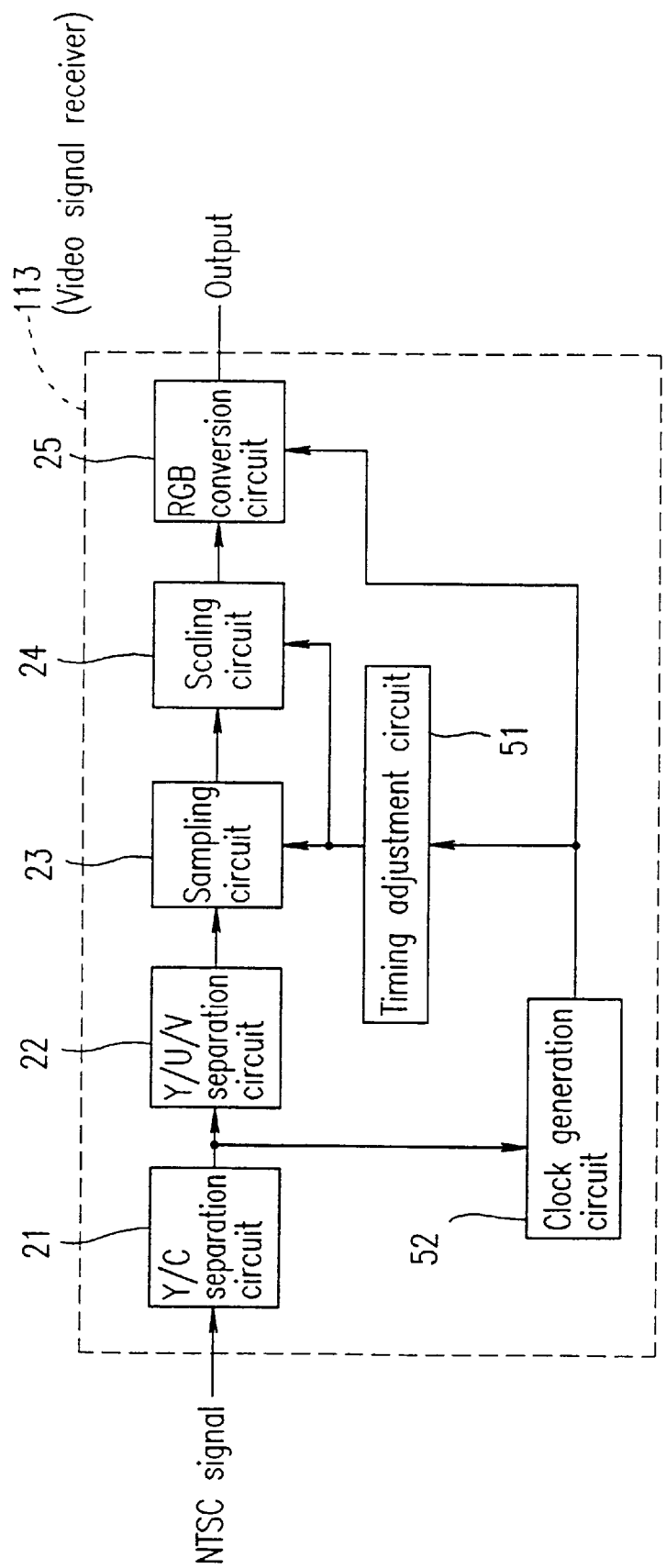
FIG. 10 is a diagram illustrating functional blocks of a conventional video signal receiver.
Figure 11:
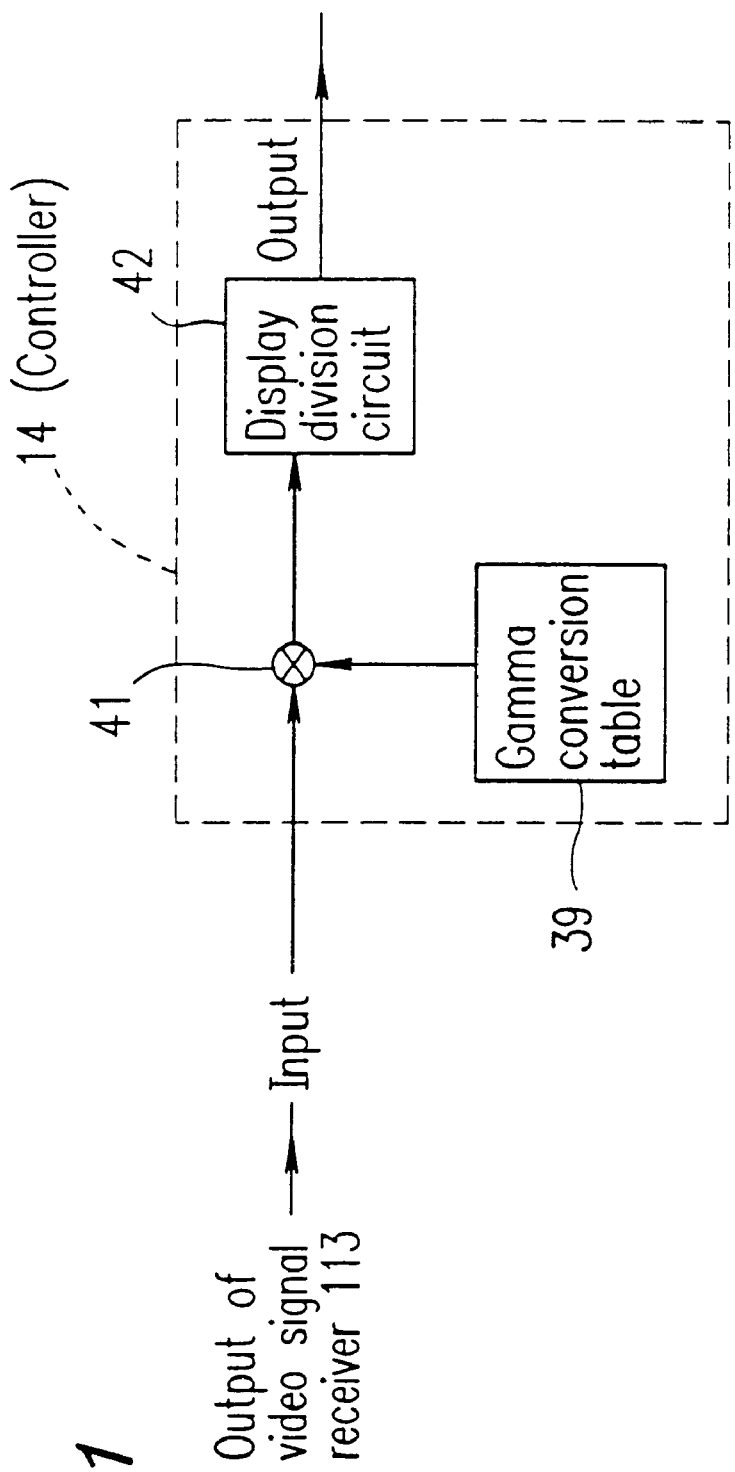
FIG. 11 is a diagram illustrating functional blocks of a conventional controller.
Figure 12:
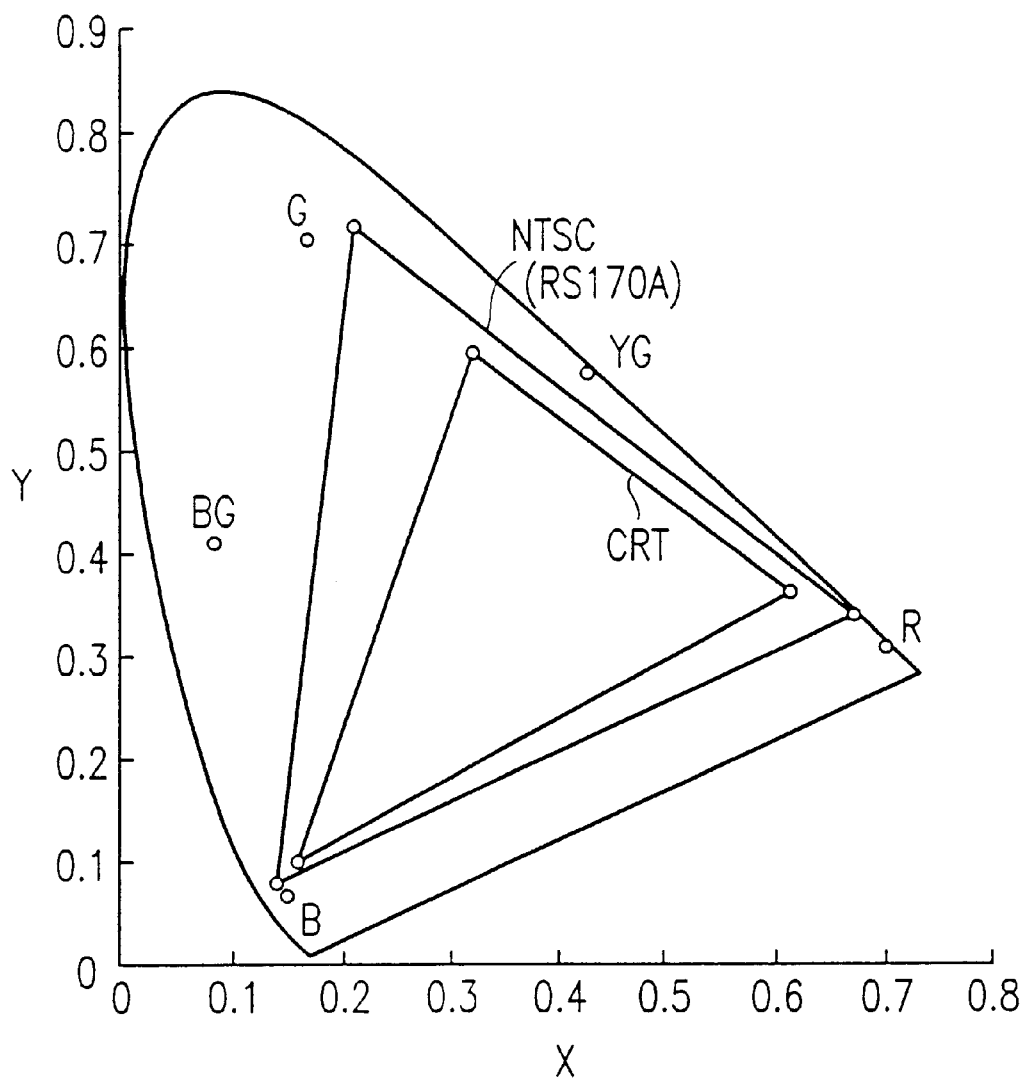
FIG. 12 is a diagram illustrating display color ranges of an NTSC signal and a CRT signal and the chromaticity of an LED.

FIG. 8 illustrates the controller 14 according to still another example of the present invention.

The present example is different from Example 4 in that the controller does not switch between the 3 point control and the 5 point control, but only the 5 point control is used. Thus, the NTSC signal and the HDTV signal are controlled under the 5 point control, while a conversion table selection circuit 136 is used so as to obtain characteristics comparable to those obtained by the 3 point control.

A control system selection circuit 135 receives a control system selection signal output from the display signal receiver 13, and indicates to the conversion table selection circuit 136 whether the input signal is an HDTV signal, an NTSC signal or an analog RGB signal. In response to this, the conversion table selection circuit 136 selects one of an HDTV conversion table 137, an NTSC conversion table 138 and a graphic conversion table 47. As a result, the digital RGB signal input from the display signal receiver 13 is converted to have the most suitable mixing ratio and the light intensity ratio to which the LED's light emitting characteristic is added according to the intensity for each of the colors, R, G and B. Then, a correction is made by the gamma conversion table 139 so that the relationship between the voltage applied to the CRT and the light intensity thereof is the same as the relationship between the voltage applied to the LED and the light intensity thereof. Thereafter, the resultant signal is sent to the LED display 17.

As described above, in the LED display system of the present invention, the display color range on a chromaticity diagram can be changed by varying the combination of the LEDs forming each dot or by controlling the mixing ratio and the light intensity ratio for each of the colors. As a result, it is possible to perform a display comparable to that conducted by the conventional CRT in displaying video signals, while allowing for a video signal to be displayed within an original display color range of an LED in displaying a graphic.

The present display system allows for graphic display such as a logo or a commercial billboard with a special hue, while also making it possible to realize a display device in which different display signal systems are automatically distinguished from one another and the display color range can be automatically or manually changed.

Moreover, the present display system has a great flexibility. Therefore, when a change is made in an existing standard or a new standard such as a digital broadcast standard is established in the future, or when a system which is not described herein such as PAL or SECAM is used, such a change can be accommodated only by incorporating a function to distinguish such a system from others and to accordingly alter the mixing ratio and the light intensity ratio of the LED.

It is also possible to change the hue of a video or graphic display to conform with the installation condition or the demand of the consumer. Furthermore, the present invention is flexibly suited to use with special effects.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A display signal processing device for processing a plurality of types of display signals, the device comprising:
    a first signal processing section for processing a television signal comprising:
        a sampling circuit for converting the television signal to a first digital signal,
        an RGB conversion circuit for converting the first digital signal to an RGB signal, and
        a first scaling circuit for scaling the first digital signal; and
    a second signal processing section for processing a non-television signal comprising:
        an A/D conversion circuit for converting the non-television signal to a second digital signal, and
        a second scaling circuit for scaling the second digital signal.

2. A display signal processing device according to claim 1, wherein:
    the television signal is one of an NTSC signal, an HDTV signal, a PAL signal and a SECAM signal, while the non-television signal is a graphic signal.

3. A display signal processing device according to claim 1, wherein:
    the first signal processing section includes an identification circuit for identifying a type of the television signal.

4. A display signal processing device according to claim 3, wherein:
    the identification circuit identifies the type of the television signal by detecting a unique component contained in the television signal.

5. An LED display system, comprising:
    an LED display section including a plurality of light emitting blocks arranged in matrix, the light emitting blocks each including three or more LEDs of different colors;
    a display signal transmission section for transmitting a plurality of types of display signals to the LED display section;
    a display signal identification section for identifying said plurality of types of display signals; and
    a color range control section for controlling a color range to be displayed on the LED display section depending on the type of the display signal identified by the display signal identification section.

6. An LED display system according to claim 5, wherein the display signal identification section identifies the type of the display signal by detecting a unique component contained in the display signal.

7. An LED display system according to claim 5, wherein the display signal identification section identifies the type of the display signal depending on a selection signal which indicates a selected one of the plurality of types of display signals.

8. An LED display system according to claim 5, the color range control section comprising:
    a control system selection circuit for selecting a control system of the LED display section depending on the type of the display signal; and
    a conversion section for converting a chromaticity coordinate of the display signal depending on the control system selected by the control system selection circuit.

9. An LED display system according to claim 8, the conversion section comprising:
    a plurality of conversion tables provided to respectively correspond to the plurality of types of display signals;
    a conversion table selection circuit for selecting one of the plurality of conversion tables; and
    a gamma conversion table provided commonly among the plurality of types of display signals.

10. An LED display system according to claim 9, the conversion section further comprising:
    a multiplier for multiplying an output of the selected one of the plurality of conversion tables by an output of the gamma conversion table.

11. An LED display system according to claim 8, the conversion section comprising:
    at least two processing sections each for processing chromaticity coordinate values for three or more points.

12. An LED display system according to claim 11, the at least two processing sections comprising a processing section for a television signal and a processing section for a non-television signal.

13. An LED display system according to claim 11, the at least two processing sections comprising processing sections for two types of television signals.

14. An LED display system according to claim 5, wherein the display signal identification section outputs an identification signal indicating the type of the display signal, the identification signal being a digital signal.

* * * * *